Jan. 3, 1956 W. J. HUGHES 2,729,362
CHEMICAL FEEDER

Filed July 17, 1953 3 Sheets-Sheet 1

Jan. 3, 1956  W. J. HUGHES  2,729,362
CHEMICAL FEEDER

Filed July 17, 1953  3 Sheets-Sheet 2

Jan. 3, 1956

W. J. HUGHES 2,729,362

CHEMICAL FEEDER

Filed July 17, 1953

INVENTOR.

BY

United States Patent Office 2,729,362
Patented Jan. 3, 1956

2,729,362

CHEMICAL FEEDER

Walter J. Hughes, Tucson, Ariz., assignor to Infilco Incorporated, Tucson, Ariz., a corporation of Delaware Application July 17, 1953, Serial No. 368,622

7 Claims. (Cl. 222—161)

This invention relates to a feeder for dry pulverant material.

It is an object of the invention to provide an improved feeder for dry pulverant material.

Another object is a dry chemical feeder capable of accurately feeding at all feed rates.

Another object of the invention is to provide a feeder of this general type which has a linear feed rate adjustment and can readily be set to feed at any desired rate over a wide range.

Another object is to provide a feeder for dry pulverant material including a chute or delivery member oscillating through a fixed amplitude and at a constant rate and a feed pan oscillating with the chute at an amplitude adjustable relative to the amplitude of oscillation of the chute to obtain different feed rates.

Another object is to provide in a feeder for dry pulverant material a continuous and uniform upheaving of the material in the feeder at all feed rates down to zero.

Other objects will become apparent upon consideration of the detailed description and the claims which follow.

Feeders for pulverant materials ordinarily comprise a bin or hopper for the material to be fed, a receiving surface onto which the material is fed, usually by gravity, and means for discharging measured quantities of material from the receiving surface. The receiving surface may be stationary, such as a table or plate, or movable, such as a rotatable disk, an oscillating pan, or a belt conveyor.

Certain materials, such as, for example, hydrated lime, have a tendency to compact in the bin and to form an arch over its outlet opening, whereby uniform flow of material from the bin is prevented. It has been usual, therefore, to provide some agitating means operating inside the bin or adjacent its outlet, to prevent compacting and arching of the material and insure a continuous uniform gravity flow from the bin conducive to accurate feeding. It has also been proposed to interpose an oscillating hopper between the bin and the receiving surface and to utilize its oscillations for upheaving of the material in the bin and also for sweeping material from the receiving surface. Feeders of this type, however, had the drawback that the amplitude of the oscillations decreased with the feed rate, and thus upheaving practically ceased at small feed rates. This drawback has been overcome in the feeder described in my Patent No. 2,520,545, where arching of the material adjacent the outlet of the bin is prevented by imparting to the oscillating feed tray a continuous rocking movement which is independent of the reciprocating motion of the feed tray. Thus upheaving continues even at the smallest feed rate, where reciprocation practically ceases. To agitate the material in the upper portion of the bin, agitating plates are oscillated into and out of the hopper.

While this feeder operates with great exactness, the means for upheaving and agitating the material in the bin are complicated and are additional to the means for oscillating the feed tray. I now propose to so construct my new feeder that the material in the bin is continuously agitated and upheaved by the reciprocating motion of the feed mechanism, without the use of additional rocking or agitating means, the upheaving continuing uniformly at any feed rate, down to zero. I also provide simple means for setting the feed rate.

The invention will be more readily understood by reference to the drawings which form a part hereof and wherein similar elements in the several figures are designated by the same reference characters.

The main parts of the feeder are a stationary bin or hopper 10 of suitable size to hold a supply of the material to be fed, a delivery member or chute 11 reciprocable underneath the stationary hopper, a receiving pan or tray 12 linked to the chute 11 for reciprocation therewith, drive means for reciprocating the chute and tray in unison, and means for limiting the amplitude of reciprocation of the tray relative to that of the chute.

Figure 1:
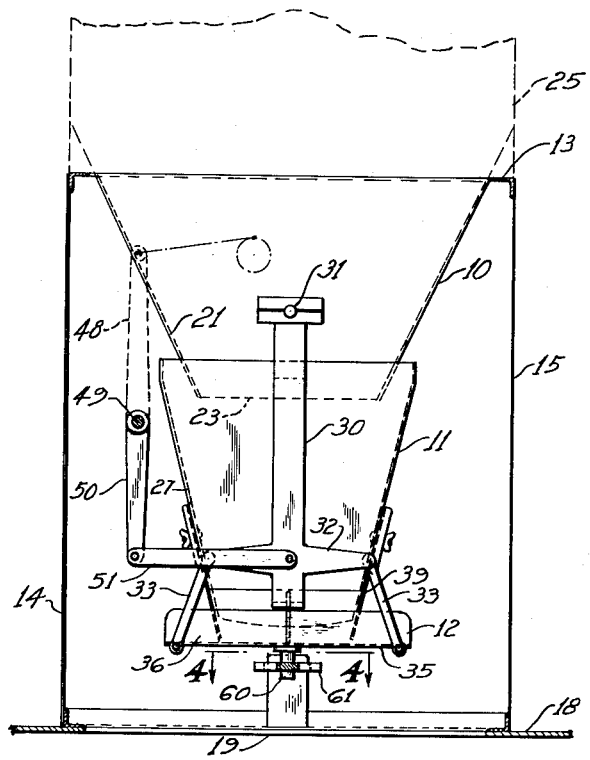
Figure 1 is a front view partially in section of a feeder according to the invention.
Figure 2:
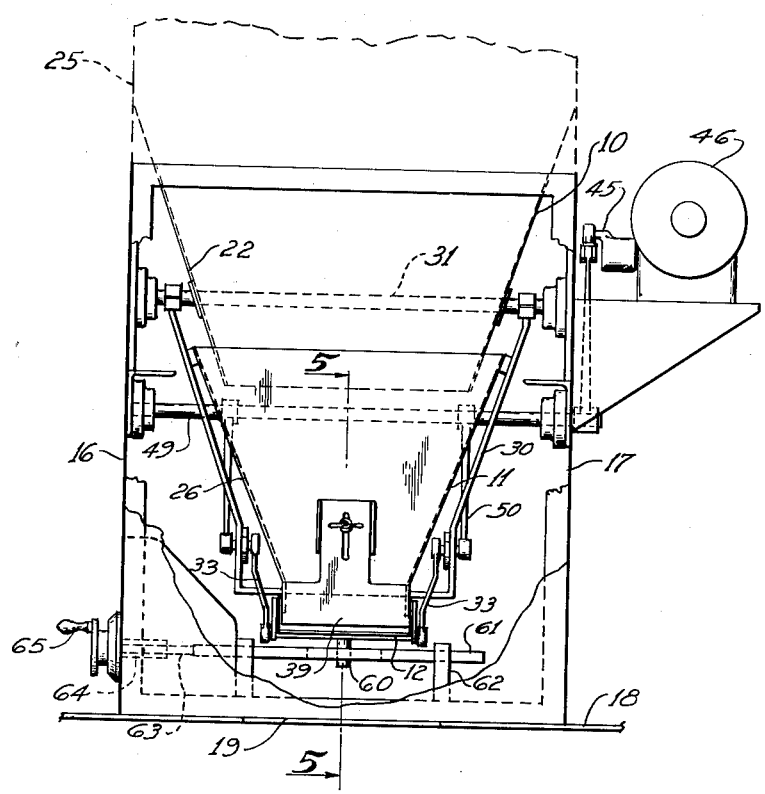
Figure 2 is a side elevation of the feeder of Figure 1, partially broken away.

As shown in Figures 1 and 2, the feeder is mounted on a framework 13, including upstanding parallel side walls 14 and 15 and end walls 16 and 17, and a base plate 18, which may be the top of a mixing tank, lime slaker, or the like, and be provided with a suitable opening 19 through which the extruded material drops into the underlying apparatus.

The bin or hopper 10 is generally rectangular in cross-section, and has sloping side walls 21 and end walls 22 and an open lower end 23. A suitable storage hopper 25 may be supported on the framework above the bin 10, or be integral with the bin. The delivery member or chute 11 is axially aligned below the bin 10, and receives the material from the bin, and delivers it to the feed pan or tray 12. The upper part of the member 11 may extend about the lower portion of the bin 10 in spaced relationship thereto, as shown. The member 11 is of prismatic shape, with sloping side walls 26 and end walls 27. The lower portions of the side walls 26 are bent to the vertical.

The delivery chute 11 is reciprocably supported by arms 30, which are pivoted on a shaft 31. The shaft 31 may extend through the bin 10, and its outer ends are supported in suitable bearings by the walls 16 and 17 of the frame 13. The arms are fitted with brackets 32, from which the feed pan 12 is pivotally supported by means of arms 33 in axial alignment with the bin and delivery member, as shown.

The feed pan or tray 12 has a substantially flat bottom 35 and upstanding side walls 36, while the ends 37 of the pan are open. The pan 12 is of sufficient width to enclose the lower portion of the chute 11 between its sides. Due to the fact that the lower ends of the side walls 26 of the chute 11 are bent to the vertical, they are parallel to the sides of the pan 12, and clearance between the side walls 26 and the pan can be small. The end walls 27 of the chute 11 are provided with slidable gates 39. A plate 40 is mounted on the lower vertical portion of the side walls 26 of the chute, about midway between the end walls 27 and extends downwardly to the bottom 35 of the pan 12.

Figure 3:
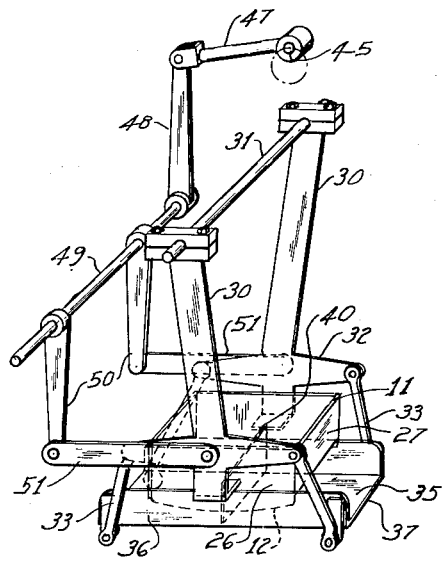
Figure 3 is a perspective view of the drive mechanism of the feeder.

A reciprocating motion is imparted to the chute 11 by an eccentric 45 driven from a motor-reducer 46 and connected to the arms 30 through suitable linkage. As best shown in Figure 3, the eccentric 45 is connected by a link 47 to a crank 48. The other end of the crank 48 is rigidly affixed to a rocker shaft 49, which is rotatably supported in suitable bearings by the walls 16 and 17 of the frame 13. Also rigidly affixed to the shaft 49 is a pair of arms 50. The lower ends of arms 50 are pinned to links 51, whose free ends are pinned to the arms 30.

As the motor 46 rotates the eccentric 45, the crank 48 is reciprocated back and forth through an angle determined by the throw of the eccentric. The shaft 49 is turned by the crank 48, and reciprocates the arms 50 through the same angle through which the crank 48 moves. Reciprocation of the arms 50 in turn imparts through links 51 a reciprocating motion to the arms 30, and thereby to the chute 11 and tray 12.

With the means described so far the chute 11 and pan 12 will reciprocate together at uniform rate and uniform amplitude of reciprocation. Obviously, when the amplitude of reciprocation of the pan is the same as that of the chute, no feeding will take place as the plate 40 will not move relative to the pan 12, but will always remain across its center. This is, therefore, the zero position of the feeder. To obtain feeding a relative motion between the pan and the chute must be established. To this end the pan is equipped with a stop pin 60 extending downwardly from the center of its bottom, and rate-setting means are provided which cooperate with the stop pin to limit the swing of the pan to a desired amplitude.

Figure 4:
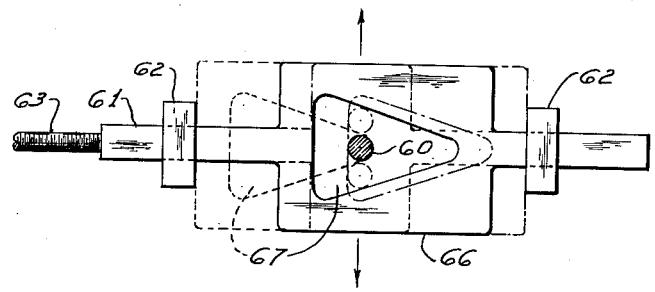
Figure 4 is an enlarged horizontal sectional view along line 4—4 of Figure 1.

The rate-setting means may take the form of a rate setter bar 61, slidably supported in bearings 62 below the tray 12 centrally across the direction of its reciprocation. The bar 61 has a threaded extension 63 on which rides a nut 64 which extends through wall 16 of the frame 13 and can be turned by means of a hand wheel 65. By turning the nut 64, the bar 61 can be advanced or retracted. As shown in Figure 4, the bar 61 has an enlarged plate portion 66, provided with a cam-shaped slot 67, across which the pin 60 reciprocates. The extent of movement of the plate 66 is limited in both directions by the bearings 62.

By positioning of the slot 67 the amplitude of reciprocation of the pin 60, and therefore the feed rate, can be varied. The slot 67 is shaped to obtain a linear relation between the amplitudes of reciprocation of the pin 60 (and therefore of the pan 12) and of the chute 11 with its plate 40, respectively. The maximum feed rate is obtained when the slot 67 is in the position shown in dotted lines at the left side of Figure 4, where the pin is confined in the narrow right hand end of the slot, and no reciprocation of the pin and tray takes place, whereby the difference between the respective amplitudes of reciprocation of the tray 12 and the chute 11 is at its maximum. Conversely, when the bar 61 is advanced so that the slot 67 has the position shown in dotted lines at the right side of Figure 4, the amplitude of reciprocation of the pin 60 relative to that of the chute 11 is not limited, and no feed takes place, therefore. When the slot 67 is in the position shown in full lines in Figure 4, the pin 60 reciprocates across the slot 67 in the direction of the arrows, the extreme positions of the pin being shown in dotted lines. In this position of the slot 67 the amplitude of reciprocation of the pin 60, and therefore the feed rate, is intermediate the maximum and the minimum.

The operation of the feeder will be readily understood. The material to be fed is introduced into the bin 10 and flows down by gravity through the chute 11 onto the tray 12, which supports the material. During filling the gates 39 are lowered to their lowermost position adjacent the bottom 35 of the tray to prevent material from puffing out as it flows down onto the tray from a considerable height. When filling is completed, the gates are raised to a position to form on the tray 12 a ribbon of material of desired depth.

Figure 5:
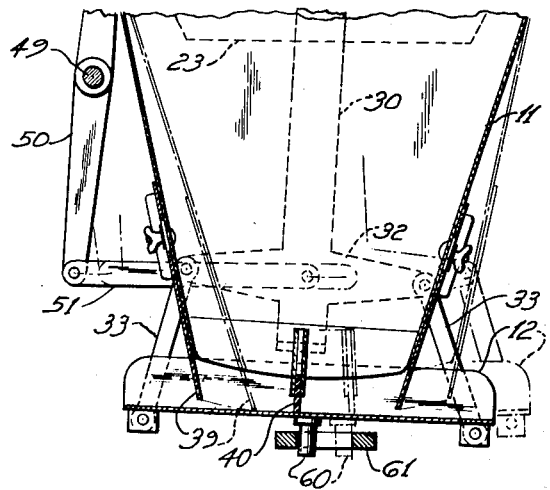
Figure 5 is a vertical sectional view, on an enlarged scale, along lines 5—5 of Figure 2, showing diagrammatically the amplitude of reciprocation of the reciprocating parts.

As the arms 50 are reciprocated by shaft 49, the chute 11 and the tray 12 reciprocate with them. To obtain the desired feed rate, the rate setter bar is positioned to adjust the amplitude of reciprocation of the tray or pan 12 relative to that of the delivery member or chute 11. When the rate setter bar is in zero position, where the pin 60 reciprocates across the widest portion of the slot 67, the chute and tray reciprocate with the same amplitude, and the plate 40 remains in a position midway between the open ends 37 of the tray, and therefore no material is swept off the tray. When the rate setter bar 61 is positioned to limit the reciprocation of the tray 12 to a smaller amplitude than that of the chute 11 and plate 40, the chute and plate move during each stroke through a larger arc than the pin 60 and pan 12. This will be clear from consideration of Figure 5, wherein the full lines indicate the left hand end positions reached by the tray 12, pin 60, chute 11, plate 40, and gates 39 with an intermediate setting of the slot 67, and the dotted lines indicate the corresponding right hand end positions. Since the plate 40 moves through a larger arc than the tray 12, some material is alternately pushed off the two ends of the tray upon each stroke of reciprocation. The amounts of material thus extruded vary with the difference between the respective amplitudes of reciprocation of the plate 40 and tray 12. Due to the cam shape of the slot 67 of the rate setter bar 61, the feed rate is directly proportional to this difference. The greatest difference, and therefore the maximum feed rate, is reached when the narrow end of the slot 67 is adjacent the pin 60, in which position reciprocation of the feed pan stops completely, or almost completely. It will be obvious that the feed rate can be readily and exactly set to any desired value intermediate zero and maximum by moving the bar 61 into the proper position. To facilitate setting of the feed rate, a pointer may be mounted on the frame 13 and a properly calibrated dial on the nut 63, as is well known in the art and, therefore, not shown.

While the reciprocating movement of the pan 12 is variable over the entire range of amplitudes from equal to the amplitude of reciprocation of the chute 11 to no reciprocation, the chute always reciprocates with uniform amplitude.

Reciprocation of the chute effects an upheaving of the material in the bin, and causes agitation at the plane of the bin outlet, which prevents arching. The upheaving and agitation are independent of the feed rate since the chute is reciprocated at uniform amplitude at all times. Therefore, even when the tray 12 is entirely stopped from reciprocating at the maximum feed rate, upheaving and agitation continue undiminished.

It will be seen that the performance of the new feeder is very exact over a wide range of feed rates, as the material to be fed always flows freely to the feed tray due to constant upheaving and agitation of the contents of the bin at any feed rate from zero to maximum. It will be obvious to those skilled in the art that many modifications of the embodiment shown and described herein can be made without departing from the spirit and scope of the invention. Accordingly, it will be understood that I do not wish to be limited to the exact details of the embodiment shown for purposes of exemplification and illustration, but not of limitation.

I claim:

1. A feeder for pulverant material comprising a bin having a discharge opening in its lower end, a reciprocably mounted delivery member below said discharge opening, said delivery member having an open top and an open bottom, means for reciprocating said delivery member at constant rate and with uniform amplitude, a tray mounted below said delivery member and linked thereto for movement therewith, means positionable to limit the amplitude of reciprocation of said tray relative to the amplitude of reciprocation of said delivery member, and means mounted on said delivery member transversely of its direction of reciprocation and extending to adjacent said tray and operative to sweep material from said tray when the amplitude of reciprocation of said tray is smaller than that of said delivery member.

2. A feeder for pulverant material comprising a bin having a discharge opening in its lower end, a tray pivotally mounted below said discharge opening, a delivery member interposed between said discharge opening and said tray and receiving material to be fed from said bin and delivering it to said tray, said delivery member being reciprocably supported, means for reciprocating said delivery member and said tray in the same direction and at constant rate and with the same amplitude, means positionable to limit the amplitude of reciprocation of said tray relative to that of said delivery member, and means carried by said delivery member and extending to adjacent said tray transversely of the direction of reciprocation and operative when the amplitude of reciprocation of said tray is less than that of said delivery member to sweep material from said tray.

3. A feeder for pulverant material comprising a stationary bin for holding the material to be fed, said bin having an open bottom, a reciprocably supported member below said open bottom, said member having an open top and an open bottom, means for reciprocating said member at a constant speed and constant amplitude of reciprocation, a tray subjacent said member and linked thereto for movement therewith, means for limiting the amplitude of reciprocation of said tray relative to that of said member, and means carried by said member and extending across said tray transversely of the direction of reciprocation of said tray to extrude material from said tray.

4. A feeder for pulverant material comprising a bin having an open bottom, a delivery member having an open top and open bottom, said member being reciprocably mounted below the bottom of said bin, means for reciprocating said delivery member at constant rate and uniform amplitude, a tray pivotally mounted below the open bottom of said delivery member in axial alignment therewith and linked to said delivery member for reciprocation therewith, stop means limiting the amplitude of reciprocation of said tray relative to that of the delivery member, and means carried by, and reciprocating at the amplitude of, said delivery member and operative to extrude material from said tray.

5. A feeder for pulverant material comprising a stationary bin having a discharge opening in its lower end, an open-ended delivery member reciprocably mounted below said discharge opening, a feed pan pivotally mounted below said delivery member, said bin, delivery member and feed pan being axially aligned, means for reciprocating said delivery member and said feed pan in the same direction and at the same rate and with uniform amplitude, rate-setting means positionable to limit the amplitude of reciprocation of said feed pan relative to that of the delivery member, and means mounted on said delivery member and extending into said feed pan and operative to sweep material from said pan when said rate-setting means are positioned to limit the amplitude of reciprocation of said pan.

6. A feeder for pulverant material comprising a stationary bin for holding material to be fed and having an open bottom, a delivery member having an open top and open bottom and underlying the bottom of said bin and receiving material therefrom, said delivery member being reciprocably supported and axially aligned with said bin, means for reciprocating said delivery member at uniform rate and with uniform amplitude, a tray linked to said delivery member for movement therewith and underlying its open bottom in axial alignment and supporting the column of material in the delivery member and the bin, means for limiting the amplitude of reciprocation of said tray relative to that of the delivery member, and means mounted on said delivery member and extending to adjacent said tray and across its direction of reciprocation, said means being operative to alternately push material from the two ends of said tray, the amounts of material pushed from said tray being proportional to the variations in the difference of amplitude of reciprocation of said tray and said delivery member.

7. A feeder for pulverant material comprising a hopper having a discharge opening at its lower end, a delivery chute having an open top underneath said hopper and receiving material therefrom, a tray underneath said chute and receiving material therefrom, a pair of pivotally supported arms reciprocably supporting said chute, means pivotally supporting said tray from said arms, drive means oscillating said arms at constant rate and uniform amplitude, rate-setting means including a cam positionable to limit the amplitude of oscillation of said tray relative to the amplitude of oscillation of said chute in linear relationship, means oscillating with said chute and extending to said tray across the direction of oscillation and operative to extrude material therefrom, the quantity of material thus extruded varying directly with the difference in the respective amplitudes of oscillation of said chute and tray as set by said rate-setting means.

References Cited in the file of this patent

UNITED STATES PATENTS

| | | |
|---|---|---|
| 535,260 | McPherson | Mar. 5, 1895 |
| 1,783,423 | Harper | Dec. 2, 1930 |
| 2,153,030 | Venable | Apr. 4, 1939 |
| 2,161,190 | Paull | June 6, 1939 |
| 2,520,545 | Hughes | Aug. 29, 1950 |
| 2,577,315 | Ellerbeck | Dec. 4, 1951 |
| 2,620,946 | Auer | Dec. 9, 1952 |